3,063,898
SOLUBLE ADRENOCHROME PREPARATIONS
Ramón María Rius Garriga, 6 Plaza Bonanova,
Barcelona, Spain
No Drawing. Filed Dec. 22, 1958, Ser. No. 781,878
Claims priority, application Spain June 17, 1958
9 Claims. (Cl. 167—65)

The present invention relates to soluble adrenochrome preparations.

The adrenochrome semicarbazone has interesting therapeutic properties: it shortens the bleeding time without coagulating action, reduces the permeability and increases the vascular resistance, and has a dynamomuscular action because of its enhancing the glucidic metabolism of muscle and is capable of normalizing the blood pressure, and therefore it is used in shock as a substitute for sanguine plasma. The oxime of adrenochrome shows similar properties.

These substances, however, are rather insoluble in water of 20° C. (about 0.05%) and therefore they can be used in very low strengths. In order to avoid the difficulties that the use of the very weak solutions causes in therapeutic practice, the use of solubilizing agents such as sodium salicylate (U.S. Patent No. 2,581,850) and sodium benzoate has been suggested, but these agents show some drawbacks from the clinical standpoint. They irritate the tissue when injected into muscles, are toxic for the hepatic cell, and bear a K-vitamin counteraction increasing the hemorrhages; that is, from the medical standpoint they are antagonistic agents for the adrenochrome semicarbazone and oxime.

It has now been found, surprisingly, that it is possible to prepare strong solutions of adrenochrome semicarbazone or oxime which can be used orally or parenterally when naphthylamino(1)-sodium sulphonate(4) or condensation products of this substance with organic acid radicals, for example, the N-acetyl-naphthylamino(1)-sodium sulphonate(4) are used as solubilizing agents.

Thus, one of the objects of the invention is andrenochrome solutions in which this useful substance is in concentrations which are far higher than those previously known, with the subsequent advantages depending on the reduction of the volume of carrier necessary for the application of the products.

A more particular object is haemostatic compositions containing an alkali-metal N lower alkanoyl naphthionate with the semicarbazone or oxime.

In accordance with the invention, adrenochrome solutions are prepared by dissolving a compound of the general formula

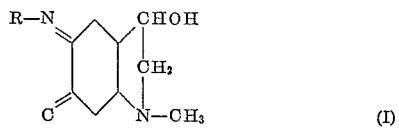
(I)

wherein R means a radical selected from the group comprising the radicals —OH and

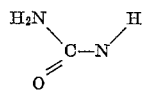

in water in the presence of a compound of the general formula

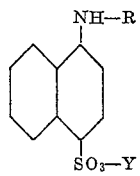
(II)

wherein

R is the acyl radical of a lower aliphatic organic acid selected from the group which includes the formic, acetic, propanoic, butanoic, aminoacetic, phenylacetic, benzoic and salicylic acids, and Y is a component selected from the group comprising hydrogen, an alkali or alkali-earth metal, amine and amido radical, and simple or organically substituted ammonium salts.

As indicated previously, the use of the naphthylamino(1)-sodium sulphonate(4) condensation products with organic acid acyl radicals, such as the N-acetyl-naphthylamino(1)-sodium sulphonate(4) enables one to obtain solutions of semicarbazone or oxime of adrenochrome with concentrations of these latter substances which are by far higher than the strengths corresponding to the solubility of the same per se in water. However, the invention is by no means restricted to obtaining solutions of a semicarbazone or oxime of the adrenochrome stronger than the normal concentrations, as explained. On the contrary, in cases wherein the naphthylamino(1)-sodium sulphonate(4) condensation products are used in synergic combination with the adrenochrome derivative, it is not mandatory to use the above high concentrations of the said adrenochrome derivative which are possible from the use of the naphthylamino(1)-sodium sulphonate(4) condensation products as a solubilizing agent, but the most suitable proportions of adrenochrome derivative for obtaining the desired synergic balance may be used, even when these concentrations are lower than those corresponding to the normal solubility of the semicarbazone or oxime of adrenochrome.

The ratio between semicarbazone or oxime of adrenochrome and the solubilizing agent can be widely varied according to the concentration of semicarbazone or oxime of adrenochrome which it is desired to obtain, and of the temperature of the solutions. The proportion of solubilizing agent is restricted by its own solubility at the given temperature. If an excess of adrenochrome or oxime is used, precipitations are liable to occur with time. The solutions can be diluted with water or with a solution of solubilizing agent without adrenochrome semicarbazone or oxime being precipitated.

The so prepared solutions may be marketed as such, or they may be dried by any known technique such as evaporation to dryness or atomization drying, eventually under lowered pressure. The resulting product is, thus, an homogeneous admixture or solids in the ideal ratios for obtaining the solutions with the desired contents of both components.

Of course, either in the case wherein the obtained therapeutic compositions are administered in the form of a solution or if the same are sold in the form of a solid admixture in given proportions, it may be started from a solid admixture prepared with the desired proportions. The dry compositions can be easily dissolved before the application thereof in order to obtain the corresponding solutions, or they may also be applied in dry form.

Of course, the prepared solutions or the dry compositions dissolved for the application thereof may contain a usual addition, for example, a local anaesthesia agent.

| No. | Bleeding time | | Modifications | |
|---|---|---|---|---|
| | Before | After | Seconds | Percent |
| 1 | 117.5 | 34.5 | −83 | 71 |
| 2 | 87.75 | 37.25 | −50.5 | 58 |
| 3 | 99 | 47.75 | −51.25 | 51.8 |
| 4 | 104.5 | 42 | −62.5 | 59.8 |
| Arithmetic averages | 102.18 | 40.35 | 61.81 | 60.15 |
| Standard departure | +8.15 | | | |

EXAMPLE 1

N-Acetyl-Naphthylamino(1)-Sodium Sulphonate(4)

40 g. of N-acetyl-naphthylamino(1)-sodium sulphonate-(4) are dissolved in 100 cc. of slightly warmed water. 1 g. adrenochrome semicarbazone is added to the solution and dissolved with the aid of a slight heating, if necessary. The solution is filtered.

This solution can be diluted to any desired extent with water or with N-acetyl-naphthylamino(1)-sodium sulphonate(4), without any precipitation of adrenochrome semicarbazone occurring.

This solution, diluted with double distilled water so that a 10% N-acetyl-naphthylamino(1)-sodium sulphonate(4) solution and 2.5 mg. adrenochrome semicarbazone per cm.$^3$, produces no pain when injected in an intramuscular manner.

It will be understood that N-acetyl-naphthylamino(1)-sodium sulphonated(4) to adrenochrome semicarbazone ratios higher than 40:1 by weight may be used, as well as lower ratios than those indicated, for example, 35:1 and even 30:1. At the ratio of 40:1 the solutions may be diluted with water in ever ratio, without precipitations occurring. The solutions may also be evaporated to dryness, preferably in the vacuum, at 50–60° C. without any decomposition taking place. This solution is stable against heat and may be sterilized by heating during 30 minutes in flowing steam.

EXAMPLE 2

Excess N-Acetyl-Naphthylamino(1)-Sodium Sulphonate-(4) With a Local Anaesthesia Agent 35 g. N-acetyl-naphthylamino(1)-sodium sulphonate-(4) are dissolved in 100 cc. double distilled water. 250 g. adrenochrome semicarbazone are added to the solution and it is stirred until dissolution. Now 50 mg. dibucaine hydrochloride (2 butoxy-N-(2 diethylaminoethyl cinchoninamide HCl) are dissolved and the solution filtered.

In this solution the therapeutic properties of N-acetyl-napthylamino(1)-sodium sulphonate(4) are even more apparent. Instead of the cited anaesthesia agent, another known anaesthesic may be used to avoid the pain produced by the administration of the concentrated solution.

EXAMPLE 3

Naphthylamino(1)-Sodium Sulphonate(4)

10 g. naphthylamino(1)-sodium sulphonate(4) are dissolved in 100 cc. water. 400 mg. adrenochrome semicarbazone are added to the solution thus obtained. It is dissolved by stirring and filtered. In this solution the ratio of napthylamino(1)-sodium sulphonate(4) to adrenochrome semicarbazone is 25:1. This solution may be diluted with water in any degree without the adrenochrome semicarbazone precipitating.

EXAMPLE 4

35 g. N-acetyl-naphthylamino(1)-sodium sulphonate-(4) are dissolved in 100 cc. double distilled water. 250 mg. adrenochrome oxime are added to the solution, and the operation is continued as in Example 2.

EXAMPLE 5

10 g. naphthylamino(1)-sodium sulphonate(4) are dissolved in 100 cc. water. 400 mg. of adrenochrome oxime are added to the solution, and it is continued as in Example 3. The obtained product shows the same properties.

I claim:

1. A haemostatic composition comprising an alkali-metal N lower alkanoyl naphthionate and adrenochrome semicarbazone.

2. A haemostatic composition comprising sodium N acetyl naphthionate and adrenochrome semicarbazone.

3. A haemostatic composition comprising an aqueous solution of an alkali-metal N lower alkanoyl naphthionate and adrenochrome semicarbazone.

4. A composition as in claim 3 wherein the alkanoyl is acetyl and the alkali-metal is sodium.

5. A haemostatic composition comprising an aqueous solution containing at least 40 grams of sodium N acetyl naphthionate and at least 1 gram of adrenochrome semicarbazone.

6. A haemostatic composition comprising an aqueous solution containing at least 35 grams of sodium N acetyl naphthioate and about 250 grams of adrenochrome semicarbazone.

7. A haemostatic composition comprising sodium N acetyl naphthionate and adrenochrome oxime.

8. A haemostatic composition comprising an aqueous solution of an alkali-metal N lower alkanoyl naphthionate and adrenochrome oxime.

9. A haemostatic composition comprising an aqueous solution containing at least 35 grams of sodium N acetyl naphthionate and about 250 grams of adrenochrome oxime in 100 cc. of water.

References Cited in the file of this patent

UNITED STATES PATENTS

| | | |
|---|---|---|
| 2,581,850 | Fleischhacker | Jan. 8, 1952 |
| 2,689,847 | Esteve | Sept. 21, 1954 |
| 2,728,772 | Barsel | Dec. 27, 1955 |
| 2,774,711 | Fleischhacker | Dec. 18, 1956 |
| 2,791,532 | Fleischhacker | May 7, 1957 |

OTHER REFERENCES

Chem. Abs., vol. 46, 1952, p. 1522i; vol. 48, 1954, p. 8939g.

U.S. Disp., J. B. Lippincott Co., Phila., 24th Ed., 1947, p. 1329.

Blood: The J. of Hematology, vol. 11, No. 12, December 1956, p. 1151.

Beilstein, Springer, Berlin, 1931, vol. 14, pp. 739–743.

Trans. Faraday Soc., vol. 47, 1951, pp. 522–527.